(12) United States Patent
Lu

(10) Patent No.: US 8,554,076 B1
(45) Date of Patent: Oct. 8, 2013

(54) METHODS AND SYSTEMS FOR CONSTRUCTING OPTICAL NETWORKS

(75) Inventor: Xiaolin Lu, Highlands Ranch, CO (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1894 days.

(21) Appl. No.: 09/678,543

(22) Filed: Oct. 4, 2000

Related U.S. Application Data

(60) Provisional application No. 60/157,488, filed on Oct. 4, 1999.

(51) Int. Cl.
*H04B 10/20* (2011.01)
*H04J 14/00* (2006.01)

(52) U.S. Cl.
USPC .............................................. 398/60; 398/67

(58) Field of Classification Search
USPC ................................................ 398/68, 70–72
See application file for complete search history.

(56) References Cited

U.S. PATENT DOCUMENTS

| 5,801,864 A * | 9/1998 | Takai et al. ..................... 398/72 |
| 6,147,786 A * | 11/2000 | Pan .................................... 398/1 |
| 6,337,754 B1 * | 1/2002 | Imajo ............................ 398/115 |
| 6,523,177 B1 * | 2/2003 | Brown .......................... 725/121 |
| 2002/0063921 A1 * | 5/2002 | Terahara et al. .............. 359/124 |

* cited by examiner

*Primary Examiner* — Shi K Li

(57) ABSTRACT

A branch-ring optical network and a technique for manufacturing a branch-ring optical network are disclosed. By connecting an outgoing optical conduit to a number of ports and one or more diffraction-grating based add/drop modules, and coupling the first distribution-node to at least one or more distribution-end-nodes having one or more diffraction-grating based add/drop modules, a branch-ring optical network that is easily constructed and maintained is formed.

20 Claims, 19 Drawing Sheets

METHODS AND SYSTEMS FOR CONSTRUCTING OPTICAL NETWORKS

This nonprovisional application claims the benefit of the U.S. provisional application No. 60/157,488 entitled "Method and Apparatus for Network Migration Configuration" filed on Oct. 4, 1999. The Applicant of the provisional application is Xiaolin LU. The above provisional application is hereby incorporated by references including all references cited therein

BACKGROUND OF THE INVENTION

1. Field of Invention

This invention relates to methods and apparatus for constructing optical communication networks.

2. Description of Related Art

As communications and computer networks become more dependent on high-speed communications systems, optical links become desirable because of their wide bandwidths. Furthermore, wavelength division multiplexed (WDM) optical networks become particularly desirable because of their comparatively increased communication capacity, versatility and restoration capabilities. However, conventional WDM optical network technologies such as optical ring networks are inconvenient to implement as compared to branched topologies. As a result, optical ring networks are relatively difficult and costly to install as compared with various branched-networks. Accordingly, new technologies to form optical networks are desirable.

SUMMARY OF THE INVENTION

The invention provides exemplary methods and apparatus for forming optical networks having optical ring-like logical structures, yet providing the versatility of a branched-network.

In various exemplary embodiments, a branch-ring optical network and a technique for manufacturing a branch-ring optical network are disclosed. By connecting an outgoing optical conduit to a first distribution-node having an outbound receiving port, an outbound transmitting port, a return receiving port, a return transmitting port and one or more diffraction-grating based add/drop modules, and coupling the first distribution-node to at least one or more distribution-end-nodes having an outbound receiving port, a return transmitting port and one or more diffraction-grating based add/drop modules, a low-maintenance branch-ring optical network can be easily constructed.

Other features and advantages of the present invention are described below and are apparent from the accompanying drawings and from the detailed description which follows.

BRIEF DESCRIPTION OF THE DRAWINGS

The invention will be described with reference to the following figures, wherein like numerals designate like elements, and wherein.

DETAILED DESCRIPTION OF PREFERRED EMBODIMENTS

Various network technologies such as synchronous optical network (SONET) rings provide the predominate paradigm for modem optical networks. However, standard implementations of optical rings can be impractical to implement as compared to branched, or bussed, network structures such as 10-based-T networks. This inconvenience can be alleviated by forming optical ring networks using specialized linking structures that allow ring networks to physically resemble bussed structures. Accordingly, communication systems can be implemented that provide the advantages of optical ring networks, but are more easily manufactured and maintained.

Figure 1:
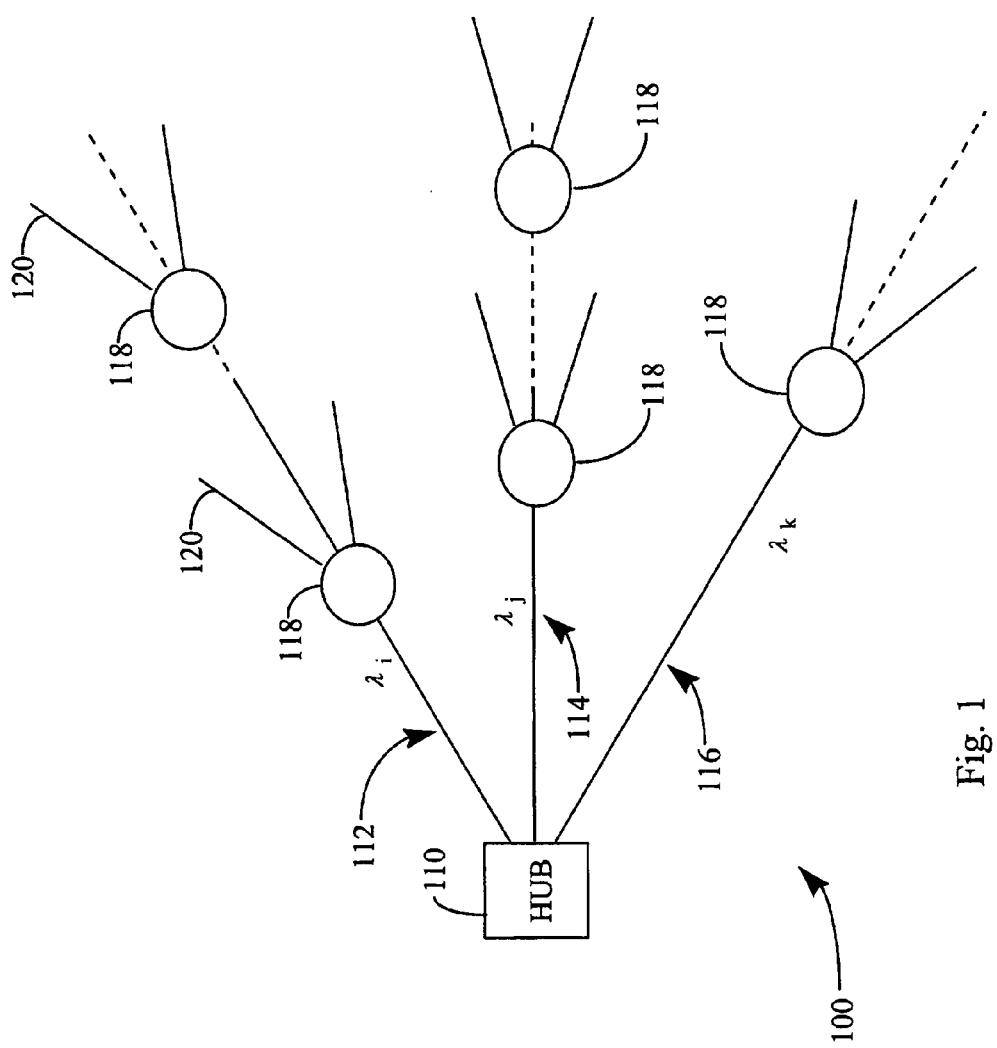
FIG. 1 is a block diagram of an exemplary optical network.

FIG. 1 is an exemplary optical network 100 having a hub 110 connected to three branches 112, 114 and 116. As shown in FIG. 1, each branch 112, 114 and 116 can have various distribution-ports 118 with each distribution-node 118 further having sub-branches 120.

In operation, optical communication signals are transmitted by hub 110 to the various branches 112, 114 and 116 and received by the distribution-nodes 118. Accordingly, the distribution-nodes 118 distribute the optical communication signals to the various sub-branches 120 or alternatively distribute the optical communication signals to other devices (not shown) such as computer terminals, routers, storage devices and the like. Similarly, other optical communication signals can be provided by the sub-branches 120, distribution-nodes 118 and other devices and relayed by the various branch 112, 114 and 116 to the hub 110.

In various exemplary embodiments, the hub 110 can be part of a larger network such as a hub on a SONET ring or alternatively the hub 110 can be a stand-alone device. However, the particular configuration of the hub 110 can vary as a design choice and can generally be any known or later developed device capable of passing signals to, and receiving signals from the various branches 112, 114 and 116.

The exemplary branches 112, 114 and sub-branches 120 can similarly be various SONET based networks passing WDM optical communication signals. However, the branches 112, 114 and 116 and sub-branches 120 can alternatively be based on any other known or later developed optical technology useable to provide optical communication signals to/from the first ring-portion 102 and the various distribution nodes 118 without departing from the spirit and scope of the invention.

Figure 2:
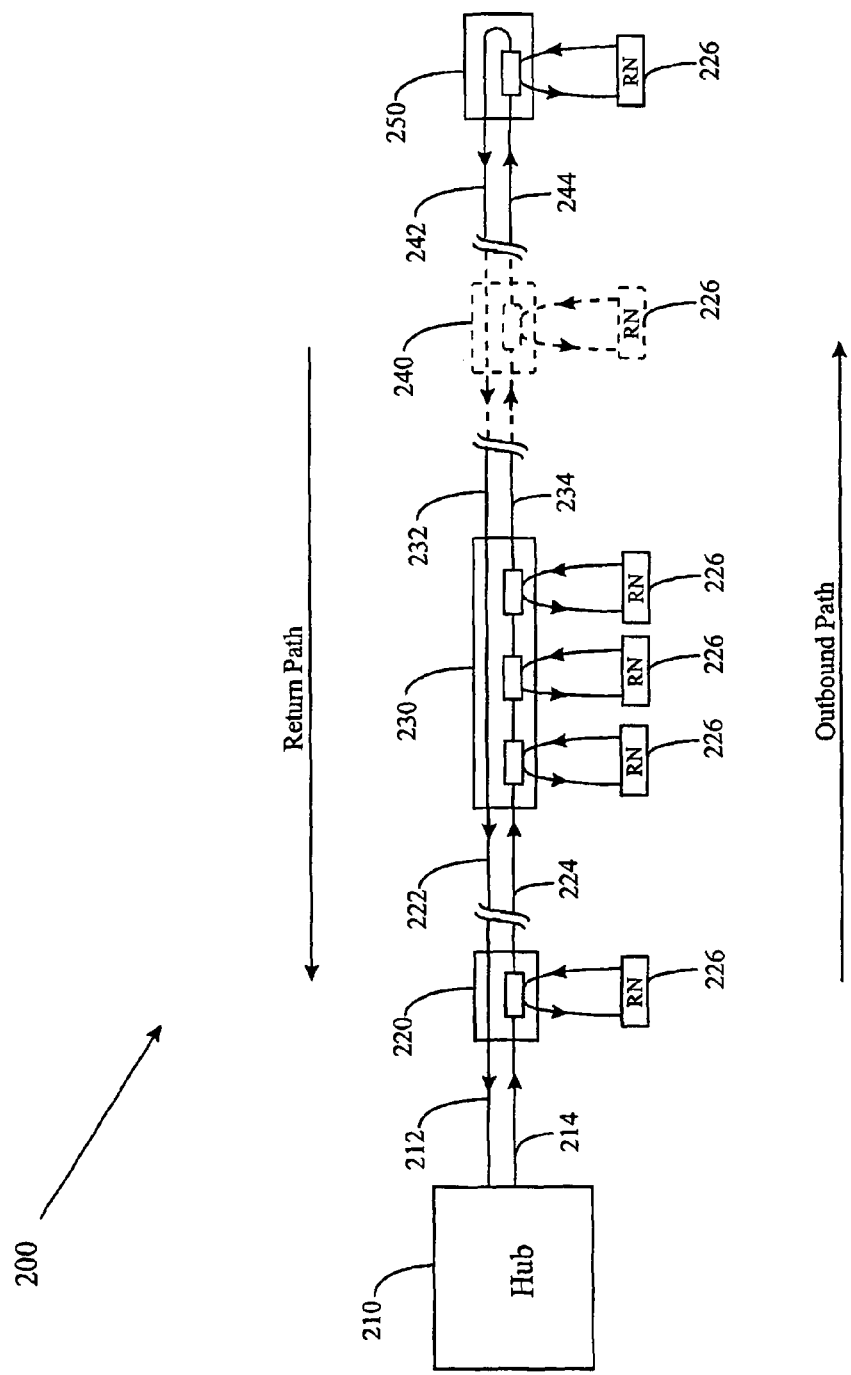
FIG. 2 is a block diagram of a first exemplary branch.

FIG. 2 is an exemplary network portion 200 of the optical network of FIG. 1. As shown in FIG. 2, the exemplary network portion 200 has a hub 210 with various distribution-nodes 220, 230 and 240 and is terminated by a distribution-end-node 250. Each of the ports 220-250 is connected to various remote-nodes 226 or other end devices(not shown).

In operation, the hub 210 transmits optical communication signals configured in a WDM format to the first distribution-node 220 using a first outbound optical conduit 214, and receives WDM outbound optical communication signals from the first distribution-node 220 using a first return optical conduit 212. As the outbound optical communication signals are provided to the first distribution-node 220, one or more of the outbound optical communication signals can be dropped from the first optical conduit 214 and provided to remote-node 226. Furthermore, the remote-node 226 can provide one or more other optical communication signals that can be added to the remaining optical communication signals, i.e., those optical communication signals not dropped from the receive optical communication signals, to produce a modified group of optical communication signals. For example, the first distribution-node 220 can receive eight optical communication signals $\lambda_1, \lambda_2 \ldots \lambda_8$ from the hub 210, drop the first two opticals $\lambda_1$ and $\lambda_2$ to the remote-node 226, add another optical signal $\lambda_1'$ provided by the remote-node 226 to the remaining optical communication signals $\lambda_3, \lambda_4 \ldots \lambda_8$ to form a modified group of optical communication signals $\lambda_1', \lambda_3, \lambda_4 \ldots \lambda_8$, that can then be provided to the second distribution-node 230 via a second outbound optical conduit 224.

As the first distribution-node 220 passes its modified group of outbound optical communication signals to the second distribution-node 230, the first distribution-node 220 can receive a group of return optical communication signals from the second distribution-node 230, through a second return optical conduit 222 and provide the return optical communication signals to the hub 210.

As shown in FIG. 2, the second distribution-node 230, is coupled to a plurality of remote-nodes 226, each capable of receiving dropped signals from the second distribution-node 230 and further providing other optical communication signals that can form a second group of modified optical communication signals. The second distribution-node 230 then provides the second group of modified optical communication signals to the third distribution-node 240 using outbound optical conduit 234 and further receives a group of return optical communication signals from the third distribution-node 240 using return optical conduit 232. The third distribution-node 240 likewise drops and adds various optical communication signals to/from another remote-module 226, provides its modified group of optical communication signals to the distribution-end-node 250 via outbound conduit 244 and further receives a group of return optical communication signals via return conduit 242.

The distribution-end-node 250, like the other ports 220-240, can add and drop one or more optical communication signals to a remote-node 226. However, the distribution-end-node 250, unlike the other nodes 220-240, does not pass its modified optical communication signals to another distribution-node, but returns its modified group of optical communication signals back to distribution-node 240 via return conduit 242.

While the first network portion 200 drops and adds optical communication signals as they proceed along the outbound signal path via outbound conduits 214, 224, 234 and 244, it should be appreciated that some or all of the optical communication signals alternatively can be added and dropped along the return path as optical communication signals travel from the end of node 250 back to the hub 210 over the return optical conduits 242, 232, 222 and 212. It should further be appreciated that, in various exemplary embodiments, the various distribution-nodes can drop and add optical communication signals both along the outbound and return paths.

Figure 3:
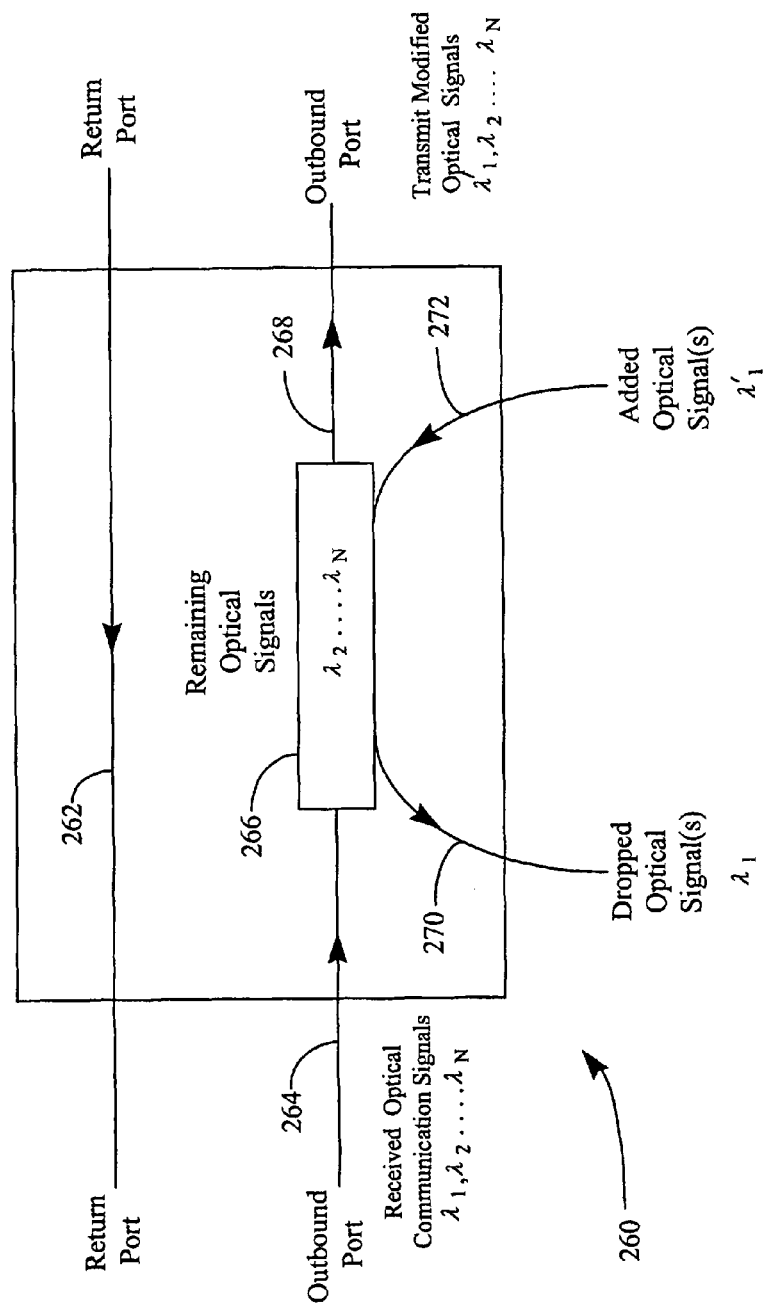
FIG. 3 is a diagram of a first exemplary distribution-node of the branch-ring network of FIG. 2.

FIG. 3 is a block diagram of a first exemplary distribution-node 260 of the network portion of FIG. 2. As shown in FIG. 3, the distribution-node 260 has a first path consisting of a first input conduit 264 at a first port, an add/drop-module 266, a first output conduit 268 at a second port and further has a second path along return conduit 262 entering and exiting at two a third and fourth port respectively. In operation, multiple optical communication signals having different wavelengths according to a WDM paradigm are provided to the add/drop-module 266 via the input conduit 264. The add/drop-module 266 can divide the optical communication signal into two portions, the first portion being a number of dropped optical communication signals, which are routed to optical conduit 270, and a remaining group of optical communication signals, which are routed to optical conduit 268. The add/drop-module 266 can further add one or more other optical communication signals to the remaining group of optical communication signals provided by optical conduit 272 to produce a modified group of optical communication signals to the first output conduit 268.

The exemplary add/drop-module 266 adds and drops the same number of optical signals having the same optical wavelengths. However, it should be appreciated that the number of added and dropped optical signals as well as their respective optical wavelengths can differ as desired or otherwise required by design without departing from the spirit and scope of the present invention. For example, add/drop-module 266 can be configured to add a single optical signal and drop a single optical signal both having an optical wavelength $\lambda_1$, or alternatively add/drop-module 266 can be configured to drop three optical signals having wavelengths $\lambda_1$, $\lambda_2$ and $\lambda_3$ and add two optical signals having wavelengths $\lambda_3$ and $\lambda_4$.

Furthermore, while the exemplary added optical signals are narrow-band optical signals such as those produced by a laser, it should be appreciated that, in various exemplary embodiments, the added optical can be broad-band optical signals such as those produced by a light-emitting diode (LED). In embodiments using LEDs, it should be appreciated that the add/drop module 266 can be configured to contain a narrow-band filter such that broad-band optical signals can be filtered to cut out all but a narrow-band of optical frequencies before being added/dropped to/from a group of optical signals.

In various exemplary embodiments, the add/drop-module 266 can be a diffraction-based wavelength selective optical device such as those described in U.S. Pat. No. 5,805,751 to Kewitsch et. al. and U.S. Pat. No. 5,875,272 to Kewitsch et al., both which are incorporated herein by reference in their entirety. However, it should be appreciated that the add/drop-module 280 can be any known or later developed device such as a thin-film optical filter, a DWM or DWDM routing device or any other device that can receive a WDM group of optical communication signals, selectively drop one or more optical communication signals, selectively add one or more other optical communication signals and provide a modified group of optical communication signals to another device.

Figure 4:
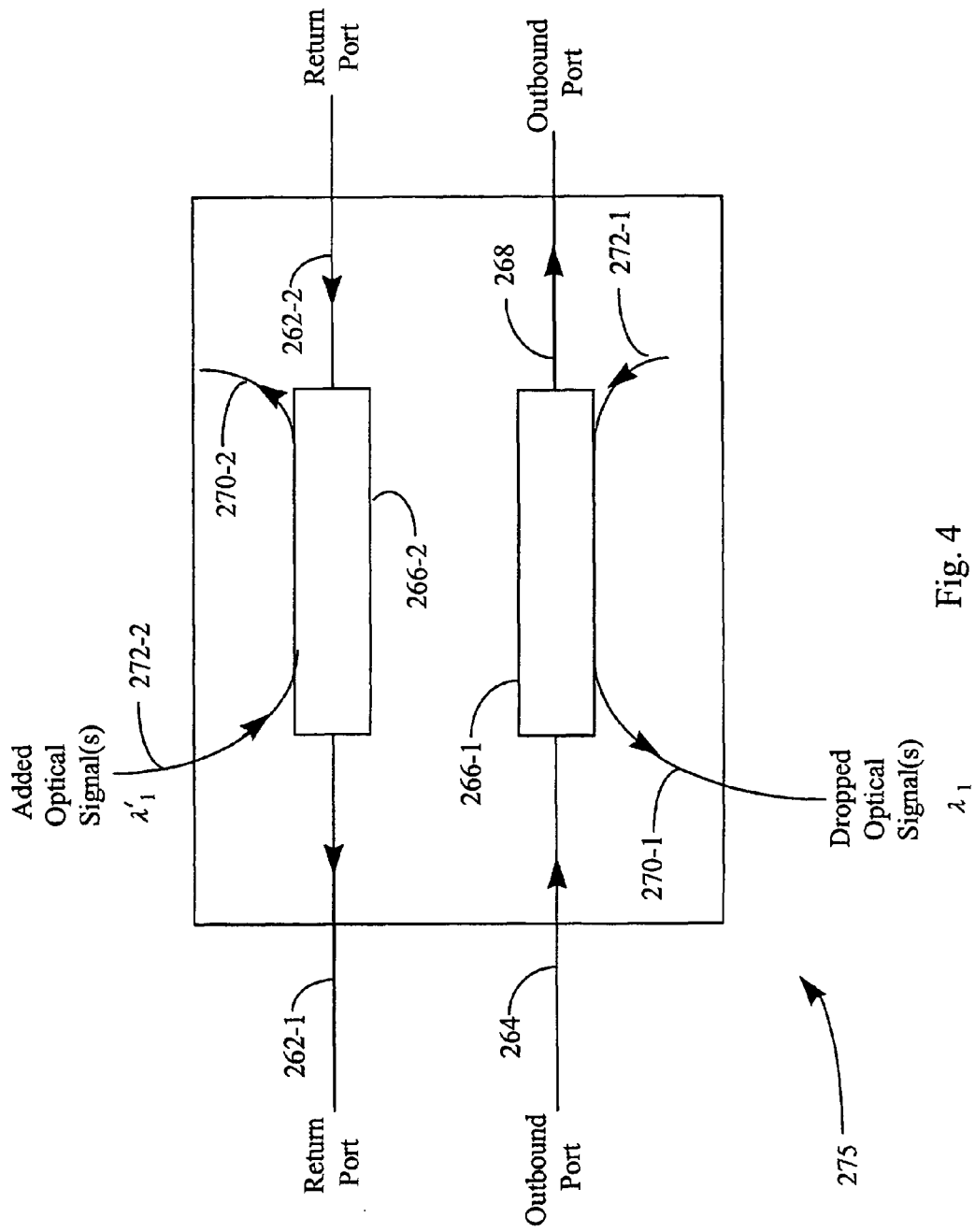
FIG. 4 is a diagram of a second exemplary distribution-node of the branch-ring network of FIG. 2.

FIG. 4 is a modified distribution-node 275 having an altered path for one or more added optical signals. That is, for any added optical communication signals containing one or more first wavelengths, instead of being added to an outbound group of optical signals, the added optical signals are added to an inbound group of optical communication signals.

As shown in FIG. 4, the modified distribution-node 275 has a first path including a first input conduit 264, a first output conduit 268 and a first add/drop-module 266-1 as well as a second path including a second input conduit 262-2, a second output conduit 262-1 and a second add/drop-module 266-2.

As with the outbound add/drop-module 266 of FIG. 3, the first add/drop-module 266-1 can drop one or more signals to optical conduit 270-1 and provide a remaining group of optical signals to the first outbound conduit. However, unlike the outbound add/drop-module 266 of FIG. 3, the first add/drop-module 266-1 does not add optical signals to the remaining group of optical signals via conduit 272-1. Instead, any added signals are added to the second add/drop-module 266-1 via conduit 272-2. This provides an added advantage in that any added signals ultimately intended for a device on the return side of distribution node 275 does not need to first travel outbound to a distribution-end-node and back before being ultimately delivered to the intended device. While FIG. 4 depicts conduits 272-1 and 270-2 as unused, it should be appreciated that conduits 272-1 and 270-2 can be eliminated entirely from their respective modules 266-1 and 266-2.

Figure 5:
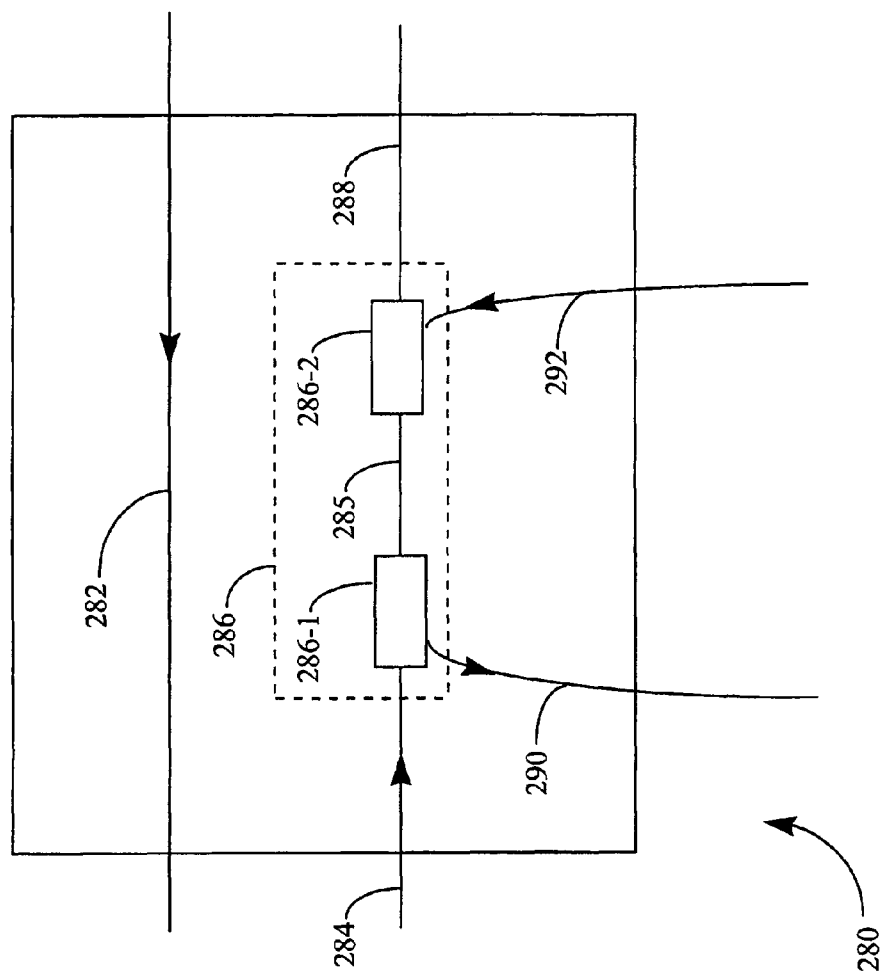
FIG. 5 is a diagram of a third exemplary distribution-node having improved performance.

FIG. 5 is a modified distribution-node 280 having enhanced signal isolation. That is, for a group of received optical communication signals containing one or more first wavelengths $\lambda_1, \lambda_2 \ldots \lambda_n$, any optical communication signals dropped from the received group of optical communication signals may not be totally removed and residual portions of their energy will propagate with the remaining optical communication signals. Furthermore, residual portions of added optical communication signals $\lambda_1', \lambda_2' \ldots \lambda_n'$ may inadvertently be mixed with the dropped optical communication signals. However, by dividing a add/drop-module into a separate drop-module and add-module, an add/drop-module can be manufactured with enhanced isolation.

As shown in FIG. 5, the enhanced isolation add/drop-module 280 has a first path consisting of an input conduit 284, an output conduit 288 and an add/drop-module 286 having a drop-module 286-1 and an add-module 286-2, and further has a return conduit 282.

As with the first add/drop-module 266 of FIG. 3, the improved isolation add/drop-module 286 can drop one or more signals to optical conduit 290 and add one or more optical communication signals provided by optical conduit 292. However, unlike the first add/drop-module 266 the improved isolation add/drop-module 286 has separate drop and add-modules 286-1 and 286-2.

In operation, optical communication signals are provided to the drop-module 286-1 via optical conduit 284 where one or more dropped optical communication signals are provided to optical conduit 290. The remaining optical communication signals are provided to an add-module 286-2 via conduit 285. The add-module 286-2 receives the remaining optical communication signals, adds one or more optical communication signals provided by optical conduit 292 to the remaining optical communication signals and provides a modified group of optical communication signals to conduit 288.

As with FIGS. 3 and 4, the exemplary add and drop-modules 286-1 and 286-2 of FIG. 5 are diffraction grating structures. However it should be appreciated that, in various exemplary embodiments, the add and drop-modules 286-1 and 286-2 can alternatively be any known or later developed devices that can separately drop one or more selected optical communication signals from a group of optical communication signals, add one or more other optical communication signals and provide a modified group of optical communication signals to an optical conduit without departing from the spirit and scope of the invention.

Figure 6:
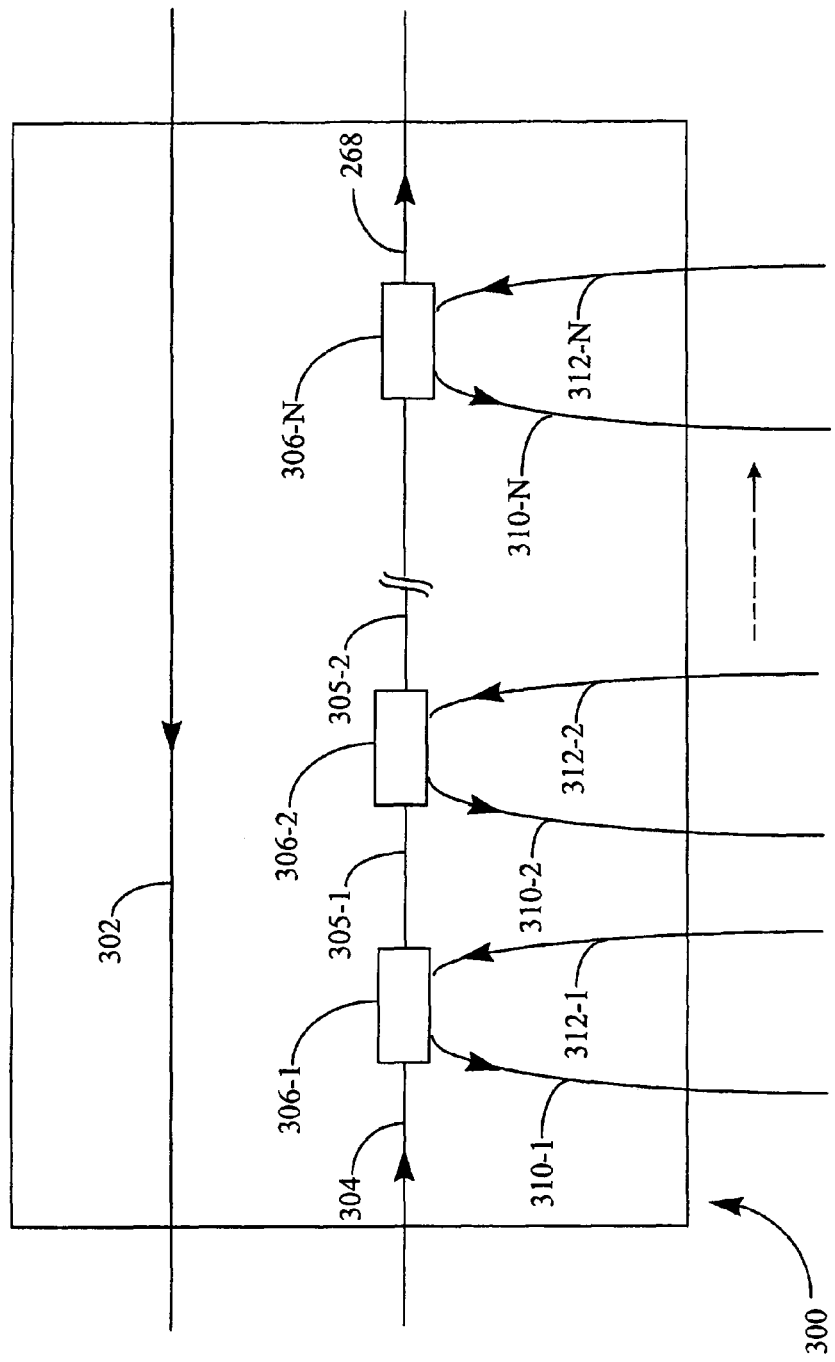
FIG. 6 is a diagram of an exemplary distribution-node having multiple add/drop-modules.

FIG. 6 is a block diagram of a third exemplary distribution-node 300 capable of receiving various WDM optical communication signals, removing one or more optical communication signals from the received group of optical communication signals, adding various other optical communication signals to the remaining signals and providing a modified group of WDM optical communication signals to another device. The distribution-node 300 can further receive a number of return optical communication signals from a first device and pass the return optical communication signals to a second device using return optical conduit 300.

In operation, the group of WDM optical communication signals is received by the first add/drop-module 306-1 via optical conduit 304 where one or more selected optical communication signals are dropped to optical conduit 310-1 and one or more other selected optical communication signals provided by optical conduit 312-1 are added to produce a modified group of optical communication signals. The modified group of optical communication signals is then provided to the second add/drop-module 306-2 via conduit 305-1. The second add/drop-module 306-2 similarly drops and adds various optical communication signals using optical conduits 310-2 and 312-2 to produce a second group of modified optical communication signals. The second modified group of optical communication signals is further received by one or more other add/drop-modules until a modified group of optical communication signals is received by the last add/drop-module 306-N, which similarly modifies the group of optical communication signals to provide a final modified group of optical communication signals to optical conduit 268.

While FIG. 6 depicts the exemplary add/drop-modules 306-1, 306-2, . . . 306-N as a single devices, it should be appreciated that each of the add/drop-modules 306-1, 306-2, . . . 306-N can alternatively be configured with separate add and drop nodes as with FIG. 4.

Figure 7:
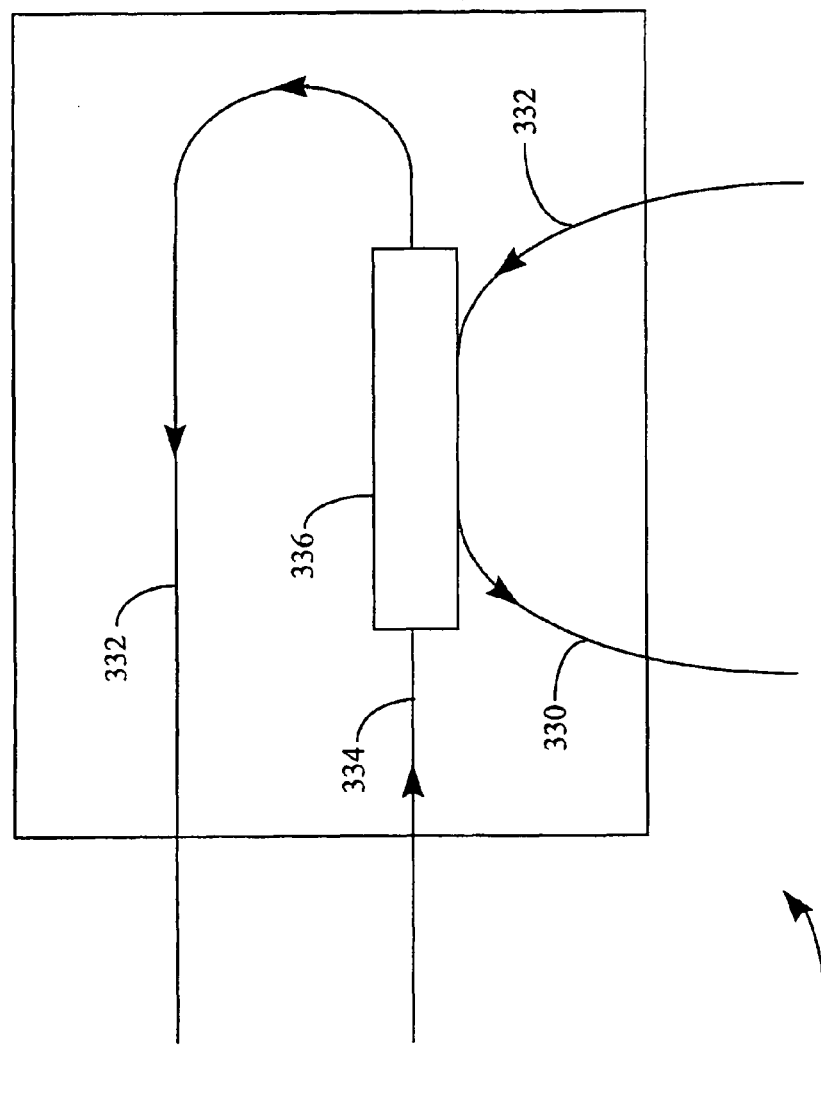
FIG. 7 is a diagram of an exemplary distribution-end-node of the branch-ring network of FIG. 2.

FIG. 7 is a block diagram of an exemplary distribution-end-node 320 of the branch of FIG. 2. As shown in FIG. 7, the distribution-end-node 320 has a first input conduit 334, an add/drop-module 336 and a first output conduit 332. The distribution-end-node 320 receives a group of WDM optical communication signals via conduit 334 and provides the optical communication signals to the add/drop-module 336. The add/drop-module 336 then drops one or more selected optical communication signals to optical conduit 330 and adds one or more other selected optical communication signals provided by optical conduit 332 to form a modified group of optical communication signals, which are then provided to optical conduit 332. While FIG. 7 depicts the exemplary add/drop-module 336 as a single device, it should be appreciated that the add/drop-module 336 can alternatively be configured with separate add and drop nodes as with FIG. 4 and/or add/drop-module 336 can have multiple add/drop devices as with FIG. 6.

Figure 8:
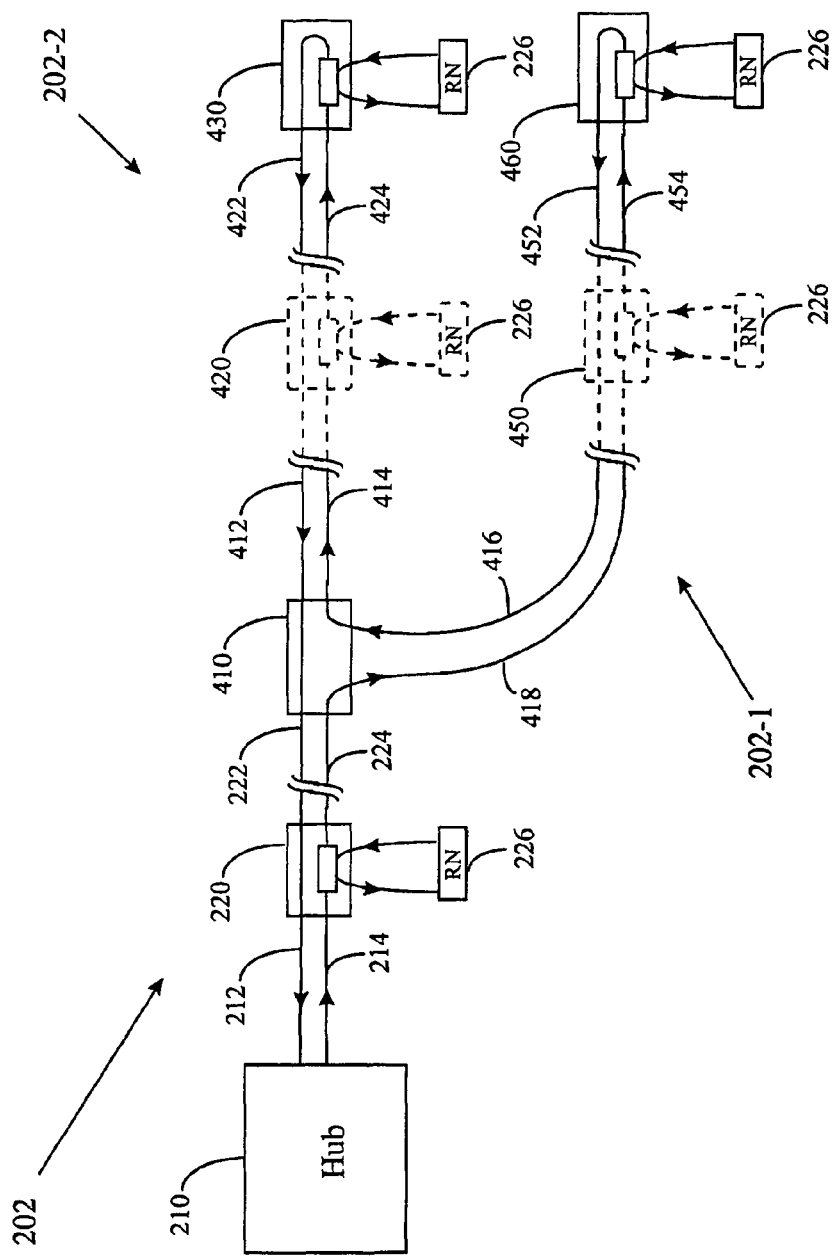
FIG. 8 is a block diagram of a second exemplary branch-ring network.

FIG. 8 is a block diagram of a second exemplary branching-ring optical network portion 202. The second branch-ring network portion 202, like the first branch 200 shown in FIG. 2, contains a number of distribution-nodes. However, unlike the first branch 200, the second exemplary branch 202 splits the network into two separate sub-branches 202-1 and 202-2 using a branch-ring splitter 410.

In operation, the branch-ring splitter 410 receives WDM optical communication signals provided by a first distribution-node 220 and routes the optical communication signals to the first sub-branch 202-1, to be received by the various distribution-nodes 450 and 460 via conduits 418 and 454. The first sub-branch 201-1 then provides a modified group of optical communication signals along its return path back to the splitter 410 via conduits 452 and 416.

The branch-ring splitter 410 receives the modified group of optical communication signals and routes the optical communication signals to the outbound optical conduit 414 of the second sub-branch 202-2 where the modified group of optical communication signals are provided to the various distribution-nodes 420 and 430 via conduits 414 and 424. The second sub-branch 202-2 then returns a second group of modified optical communication signals to the branch-ring splitter 410 via conduits 422 and 412, which in turn, are passed to the first distribution-node 220.

Figure 9:
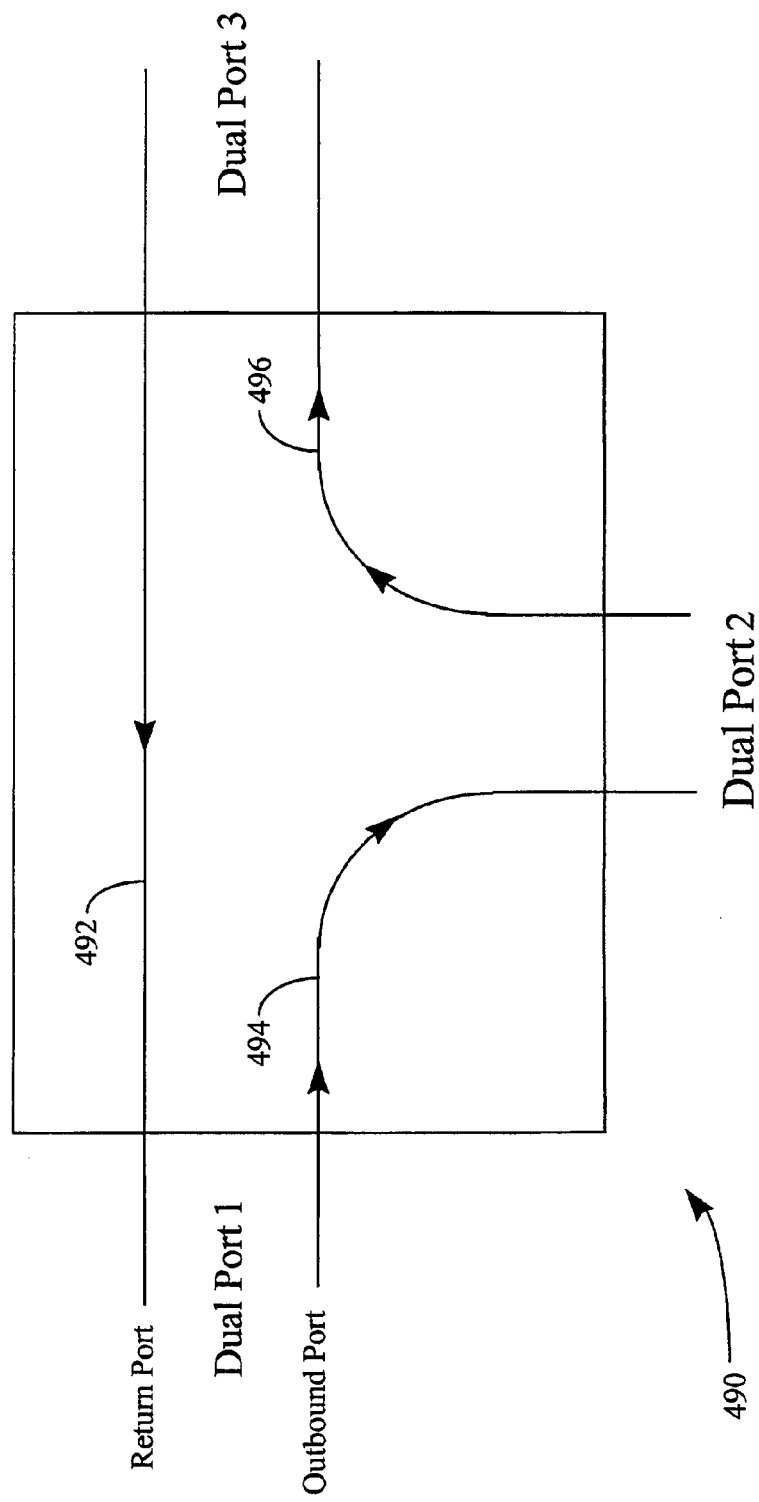
FIG. 9 is a diagram of an exemplary optical splitter of the branch-ring network of FIG. 8.

FIG. 9 is a block diagram of an exemplary branch-ring splitter of the branch of FIG. 8. As shown in FIG. 9, the branch-ring splitter 490 has three conduits 492, 494 and 496. In operation, the branch-ring splitter 490 can receive a group of WDM optical communication signals from-module one and routes the received optical communication signals from-module one to-module two using optical conduit 494. The branch-ring splitter 490 can also receive a second group of WDM optical communication signals from-module two and provide the optical communication signals to-module three using optical conduit 496. Finally, the branch-ring splitter 490 can also receive a third group of optical communication signals from-module three and provide the optical communication signals to-module one via optical conduit 492.

Figure 10:
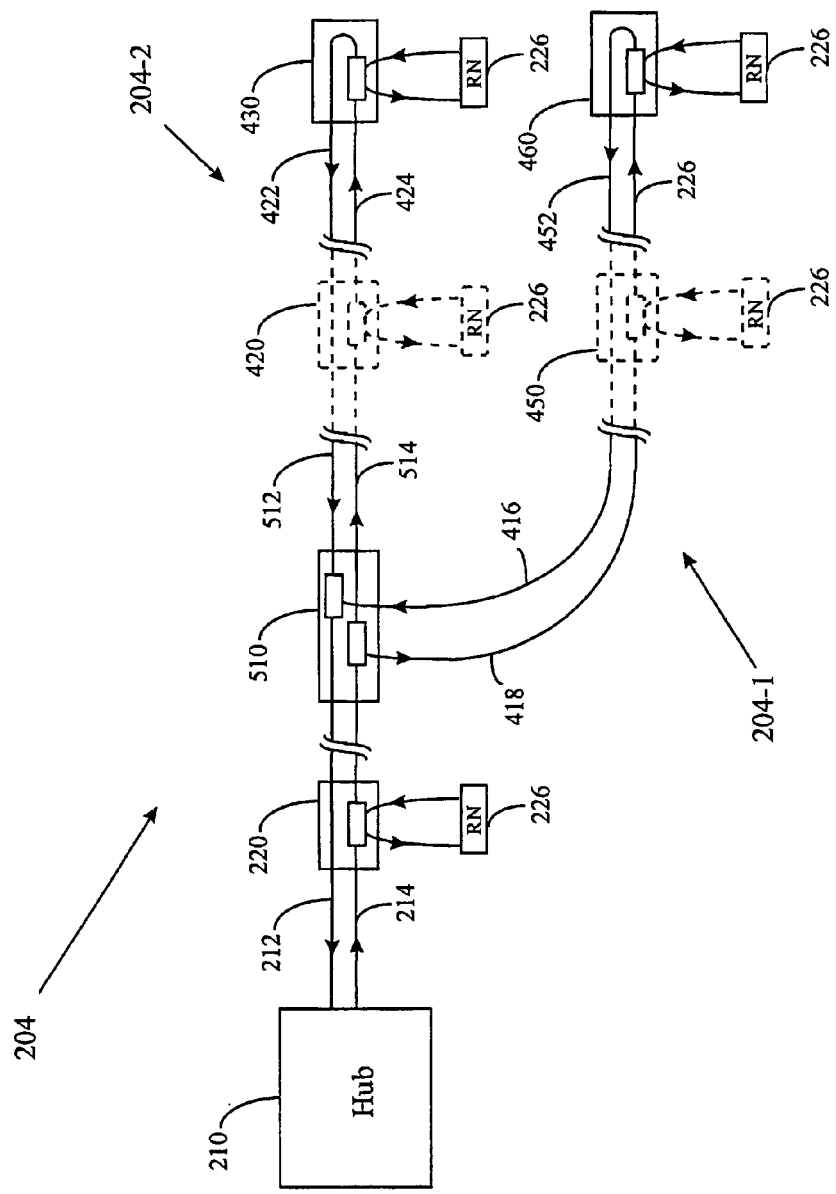
FIG. 10 is a block diagram of a third exemplary branch-ring network.

FIG. 10 is a block diagram of a second exemplary branch 204 with two sub-branches 204-1 and 204-2 each having a number of distribution-nodes and end-units 420, 430, 450 and 460. As with the branch 202 of FIG. 8, the branch-ring splitter 510 provides a branching point for the various sub-branches 204-1 and 204-2. However, unlike the first branch-ring splitter 410 of FIG. 8, the second branch-ring splitter 510 selectively divides the optical communication signals into separate groups of optical communication signals based on their wavelengths and provides the separate groups of optical communication signals to the various branch-ring sub-branches 204-1 and 204-2. For example, the branch-ring splitter 510 can receive a group of WDM optical communication signals $\lambda_1, \lambda_2, \lambda_3 \ldots \lambda_8$, split the received optical communication signals into two groups of optical communication signals $\lambda_1$-$\lambda_5$ and $\lambda_6$-$\lambda_8$, provide the first group of optical communication signals $\lambda_1$-$\lambda_5$ to the first sub-branch 204-1 and provide the second group of optical communication signals $\lambda_6$-$\lambda_8$ to the second sub-branch 204-2.

By providing a wavelength selective splitter 510, the various sub-branches 204-1 and 204-2 can be effectively isolated from each other. That is, in various exemplary embodiments, optical communication signals can be provided to/from the splitter 510 and first sub-branch 204-1 without regard to the existence or functionality of the second sub-branch 204-1. Similarly, optical communication signals can be passed to/from the splitter 510 and the second sub-branch 204-2 without regard to the first sub-branch 204-1. An advantage to selectively isolating the various branch-sub-branches 204-1 and 204-2 in this fashion can be had in that a failure of one sub-branch 204-1 or 204-2 will not affect the other sub-branch 204-2 or 204-1. For example, if optical communication signals $\lambda_1, \lambda_5$ are provided to the first sub-branch 204-1 and optical communication signals $\lambda_6$-$\lambda_8$ to the second sub-branch 204-2, any malfunction affecting optical communication signals $\lambda_1$-$\lambda_5$ will not affect the operation of the second sub-branch 204-2.

Figure 11:
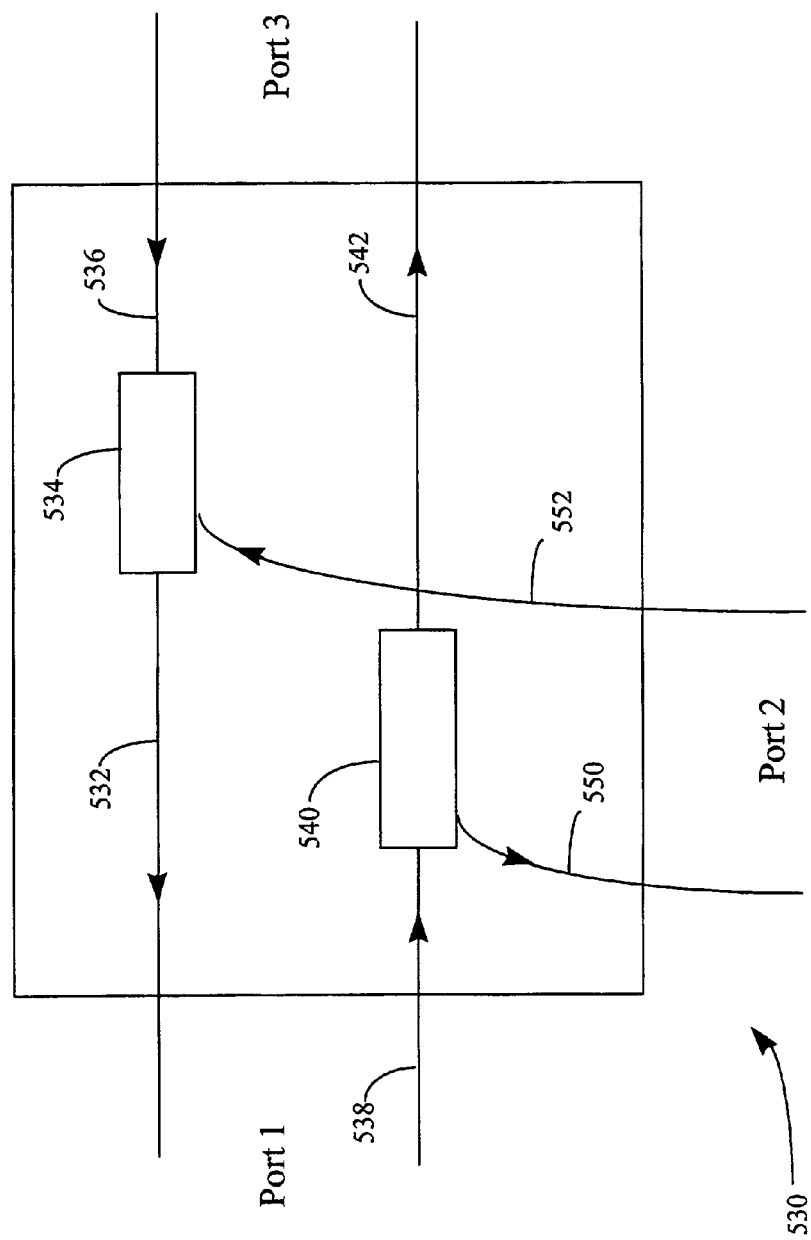
FIG. 11 is a diagram of an exemplary optical splitter of the branch-ring network of FIG. 9.

FIG. 11 is a block diagram of a second exemplary branch-ring splitter 530 capable of splitting a branch-ring network into two independent sub-branches. As shown in FIG. 11, the branch-ring splitter 530 has a drop-module 540 and an add-module 534. In operation, the drop-module 540 receives a group of WDM optical communication signals via optical conduit 538, selectively drops one or more optical communication signals from the received group of optical communication signals, provides the drop signals to optical conduit 550 and further provides the remaining optical communication signals to optical conduit 542.

The add-module 534 can also receive a second group of one or more WDM optical communication signals via optical conduit 536, receive a third group of one or more optical communication signals via optical conduit 552, combine the two groups of optical communication signals and provide the combined signals to optical conduit 532.

While FIGS. 8 and 10 depict branch-ring networks 202 and 204 each having two sub-branches, it should be appreciated that the branch-ring networks 202 and 204 can be divided into any number of sub-branches and that branch-ring splitters can be suitably altered to accommodate any number of sub-branches. It should be also appreciated that each sub-branch can be further divided into other sub-branches and so on as required by design without departing from the spirit and scope of the invention.

Figure 12:
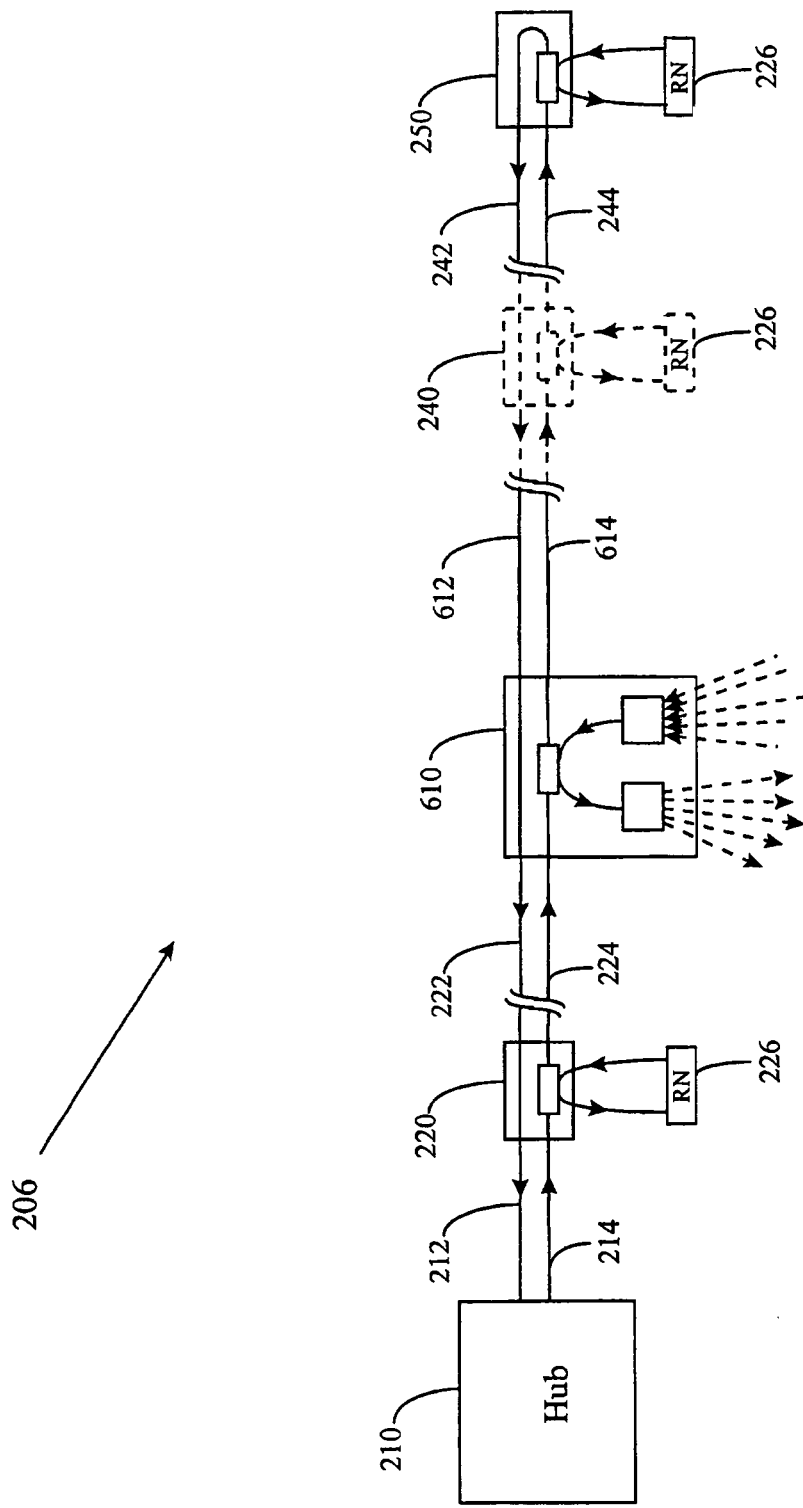
FIG. 12 is a block diagram of a fourth exemplary branch-ring network having a branch-ring distribution-node.

FIG. 12 is a block diagram of a fifth exemplary branch 206. As shown in FIG. 12, the exemplary branch 206 contains a hub 210, various distribution-nodes 220, 240 and 250 and further contains a branch-ring distribution-node 610 that can distribute and receive optical communication signals to various devices such as remote-nodes (not shown). In operation, the branch-ring distribution-node 610 receives a group of optical communication signals from the first distribution-node 220, drops one or more optical communication signals and distributes the dropped optical communication signals. The branch-ring distribution-node 610 further receives a second group of one or more other optical communication signals, adds the optical communication signals to a remaining group of optical communication signals, and provides a modified group of optical communication signals outbound to the branch 206.

Figure 13:
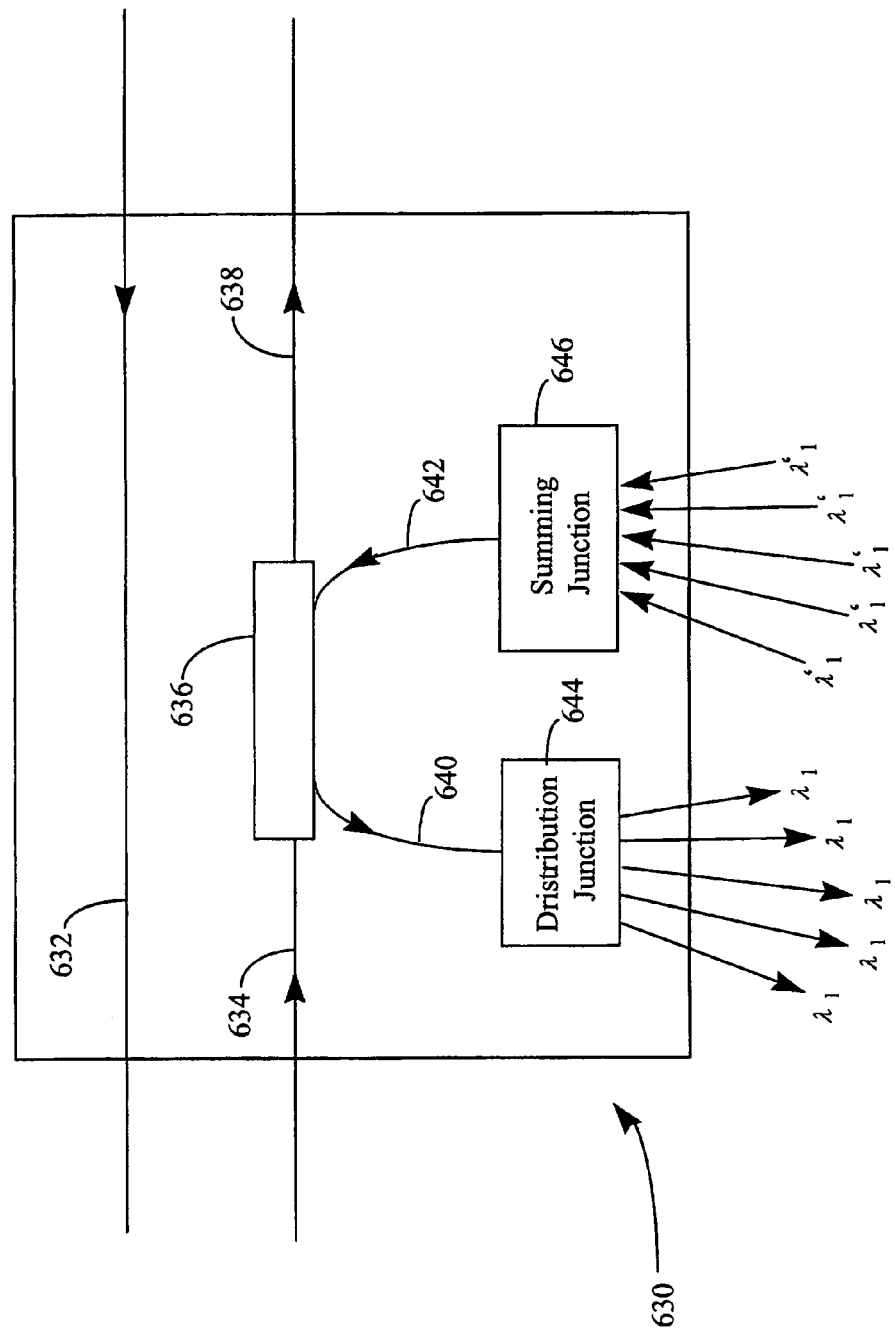
FIG. 13 is an exemplary branch-ring distribution-node of the branch of FIG. 11.

FIG. 13 is a block diagram of a first exemplary branch-ring distribution-node 630 having an add/drop-module 636, a distribution junction 644 and a summing junction 646. In operation, the add/drop-module 636 receives a group of WDM optical communication signals via optical conduit 634 and drops one or more single optical signal $\lambda_1$ to distribution junction 644 via optical conduit 640. The distribution junction 644 receives the optical signal $\lambda_1$, divides the optical signal $\lambda_1$ into a plurality of portions and distributes the portions to other devices (not shown). The exemplary distribution junction 644 is an optical splitter. However, it should be appreciated that the distribution junction 644 can alternatively be any device or system known or later developed that can receive a single optical signal, divide the optical signal into a plurality of portions and distribute the portions to various devices.

The summing junction 646 can receive one or more optical communication signals each having a particular wavelength, combine the optical communication signals and provide the combined optical communication signals to the add/drop-module 636 via the optical conduit 642. The add/drop-module 636 can then add the optical communication signals to a remaining group of optical communication signals to produce a modified group of optical communication signals, which can be provided to optical conduit 638. The exemplary summing junction 646 is an optical combiner. However, it should be appreciated that the summing junction 646 can be any system or device now known or later developed that can receive one or more optical communication signals having a particular wavelength, combine the optical communication signals and provide the combined optical communication signals to the add/drop-module 63.

Figure 14:
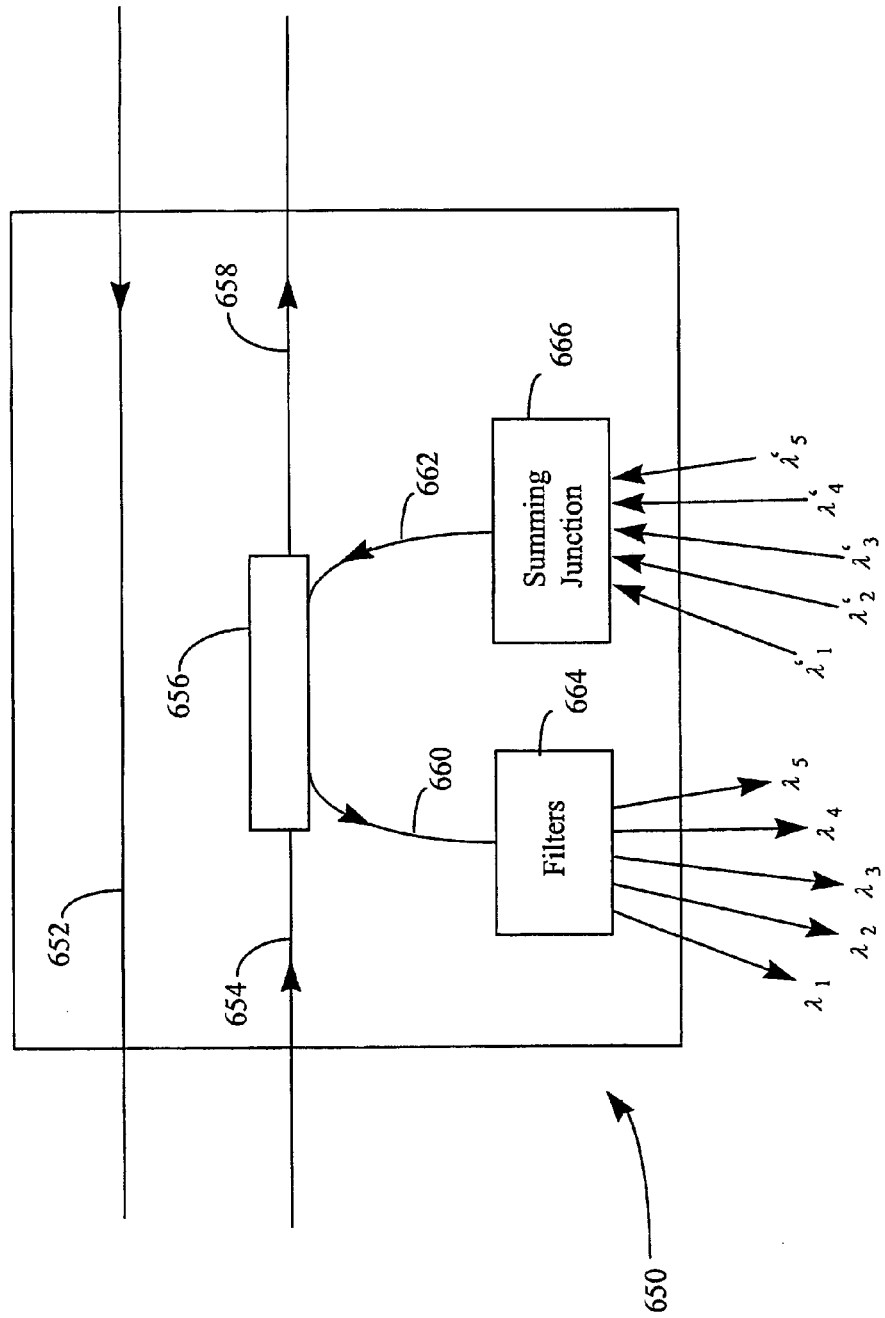
FIG. 14 is a second exemplary branch-ring distribution-node of the branch-ring network of FIG. 11.

FIG. 14 is a block diagram of a second exemplary branch-ring distribution-node 650 having an add/drop-module 656, a distribution junction 664 and a summing junction 666. As with the first branch-ring distribution-node 630 of FIG. 13, the second branch-ring distribution part 650 can distribute optical communication signals to multiple devices. However, the second branch-ring distribution-node 650 differs from the first branch-ring distribution-node 630 in that it can distribute and received optical signals based on wavelengths.

In operation, the add/drop-module 656 receives a group of WDM optical communication signals from optical conduit 654 and drops two or more optical communication signals having different wavelengths to the distribution junction 664 via optical conduit 660. The distribution junction 664 receives the dropped optical communication signals and divides the optical communication signals into individual optical conduits, each optical conduit carrying a separate optical signal. In various exemplary embodiments, the exemplary distribution junction 664 uses an array of optical filters to separate the various optical communication signals. However, it should be further appreciated that the distribution junction 664 can be any known or later developed device or system that can receive a number of optical communication signals from the add/drop-module 656, divide the optical communication signals and provide the divided optical communication signals to various other devices.

The summing junction 666 can receive a number of different optical communication signals having different wavelengths, combine the optical communication signals and provide the combined optical communication signals to the add/drop-module 656 via conduit 662. The exemplary summing junction 666 can be an optical splitter such as a grating-based splitter. However, it should be appreciated that the summing junction 666 can alternatively be any known or later developed known or later developed that can receive a number of optical communication signals having different wavelengths, combine the optical communication signals and provide the combined optical communication signals to the add/drop-module 656.

Figure 15:
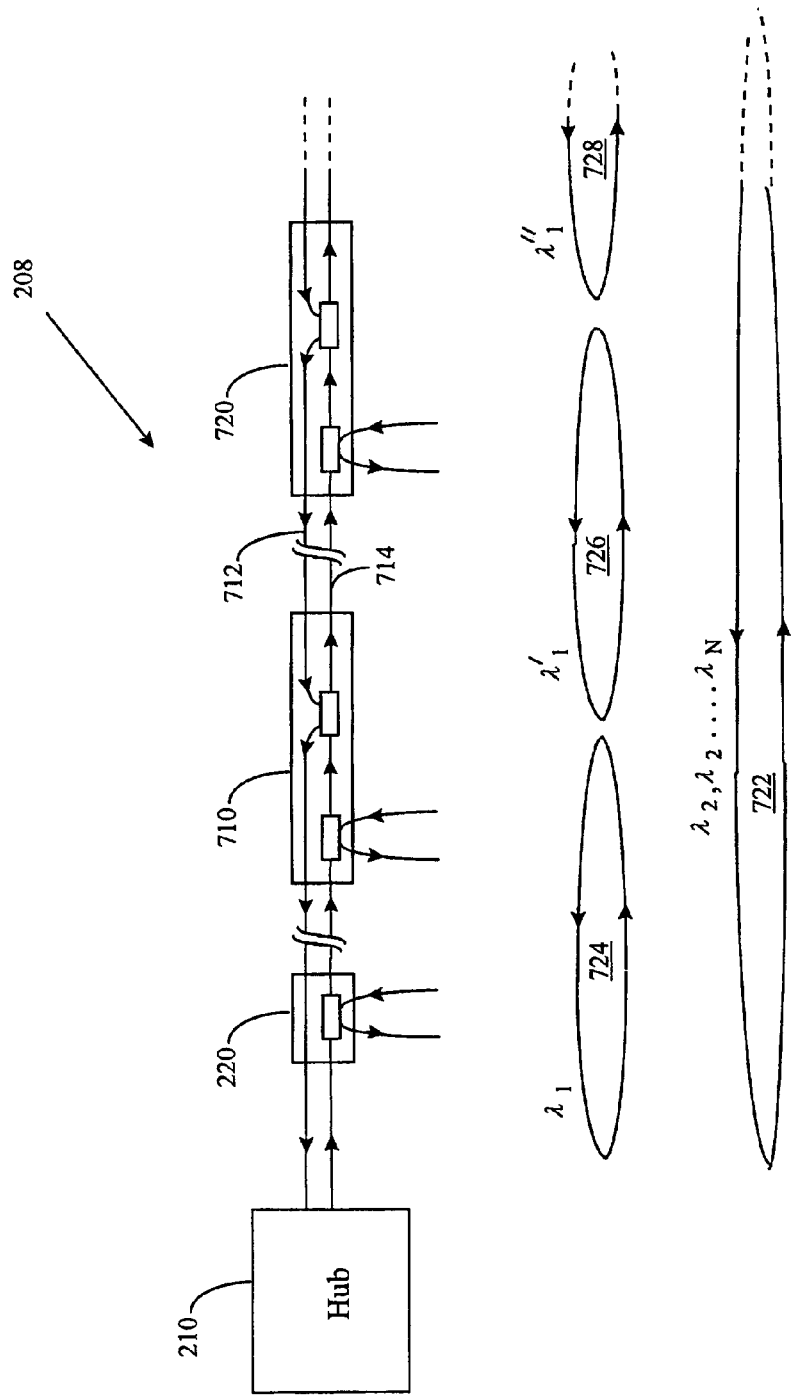
FIG. 15 is a block diagram of a fifth exemplary branch having minor rings.

FIG. 15 is a block diagram of a sixth exemplary branch 208 capable of forming a number of communication sub-rings 724, 726 and 728 as well as a primary communication ring 722. As shown in FIG. 15, the network portion 208-1 can contain a number of distribution-nodes 220 and can further contain a number of branch-sub-ring-modules 710 and 720. The combination of distribution-nodes 220 and branch-sub-ring-modules can form a primary communication ring 722 and can further form separate communication sub-rings 724, 726 and 728. While the exemplary network portion 208-1 uses a number of communication sub-rings 724-728 having the same optical wavelength $\lambda_1$, it should be appreciated that each communication sub-ring can be constructed using different optical wavelengths. Furthermore, it should be appreciated that each sub-ring can consist of multiple optical communication signals having different wavelengths and that the number of optical communication signals for each communication sub-ring can be independent from one another.

Figure 16:
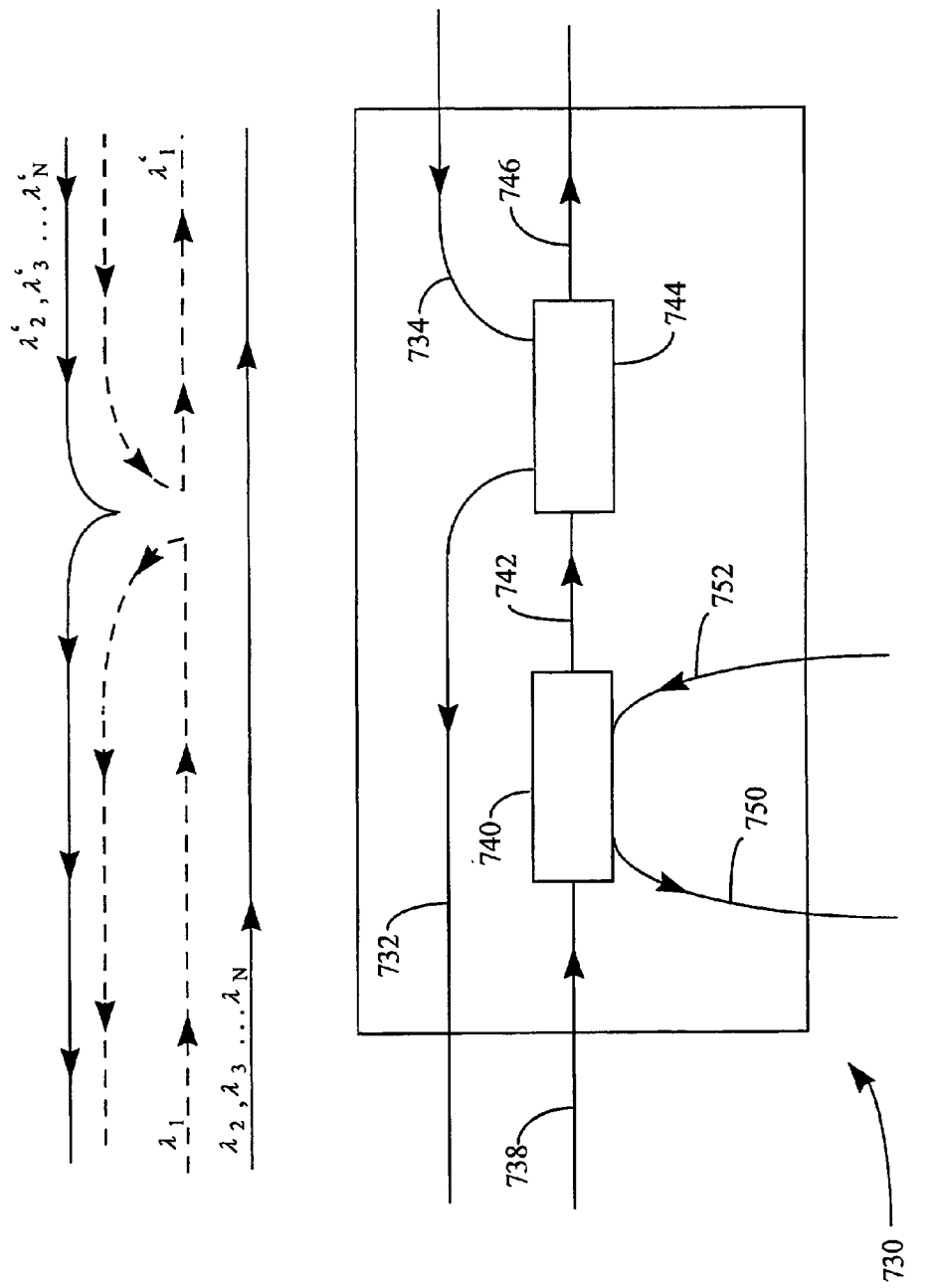
FIG. 16 is a block diagram of an exemplary branch-sub-ring-module of the branch of FIG. 14.

FIG. 16 is a block diagram of exemplary branch-sub-ring-module 730 having a first drop/add-module 740 and a second drop/add-module 744. In operation, the first drop/add-module 740 receives a left-hand group of WDM optical communication signals via optical conduit 738, drops one or more optical communication signals to optical conduit 750, adds one or more other optical communication signals from optical conduit 752 and provides a modified group of optical communication signals to the second drop/add-module 744 via optical conduit 742.

As the second drop/add-module 744 receives the modified group of optical communication signals, one or more optical communication signals are dropped to optical conduit 732 to form a feedback path for the one or more dropped optical communication signals that can be used to form a minor communication ring. The remaining optical communication signals, i.e., those optical communication signals not dropped, are provided to optical conduit 746 where they can be used to form a primary communicating ring.

The second drop/add-module 744 further receives a group of right-hand WDM optical communication signals via optical conduit 734. The second add/drop-module 744 divides the right-hand group of optical communication signals into two groups, adds the first group of optical communication signals to optical conduit 746 and routes the remaining group of optical communication signals to optical conduit 732. In this fashion, one or more optical communication signals received from optical conduit 734 can be fed-back to optical conduit 746 to form a second optical sub-ring, while the remaining signals fed to optical conduit 732 can form a primary communication ring.

Figure 17:
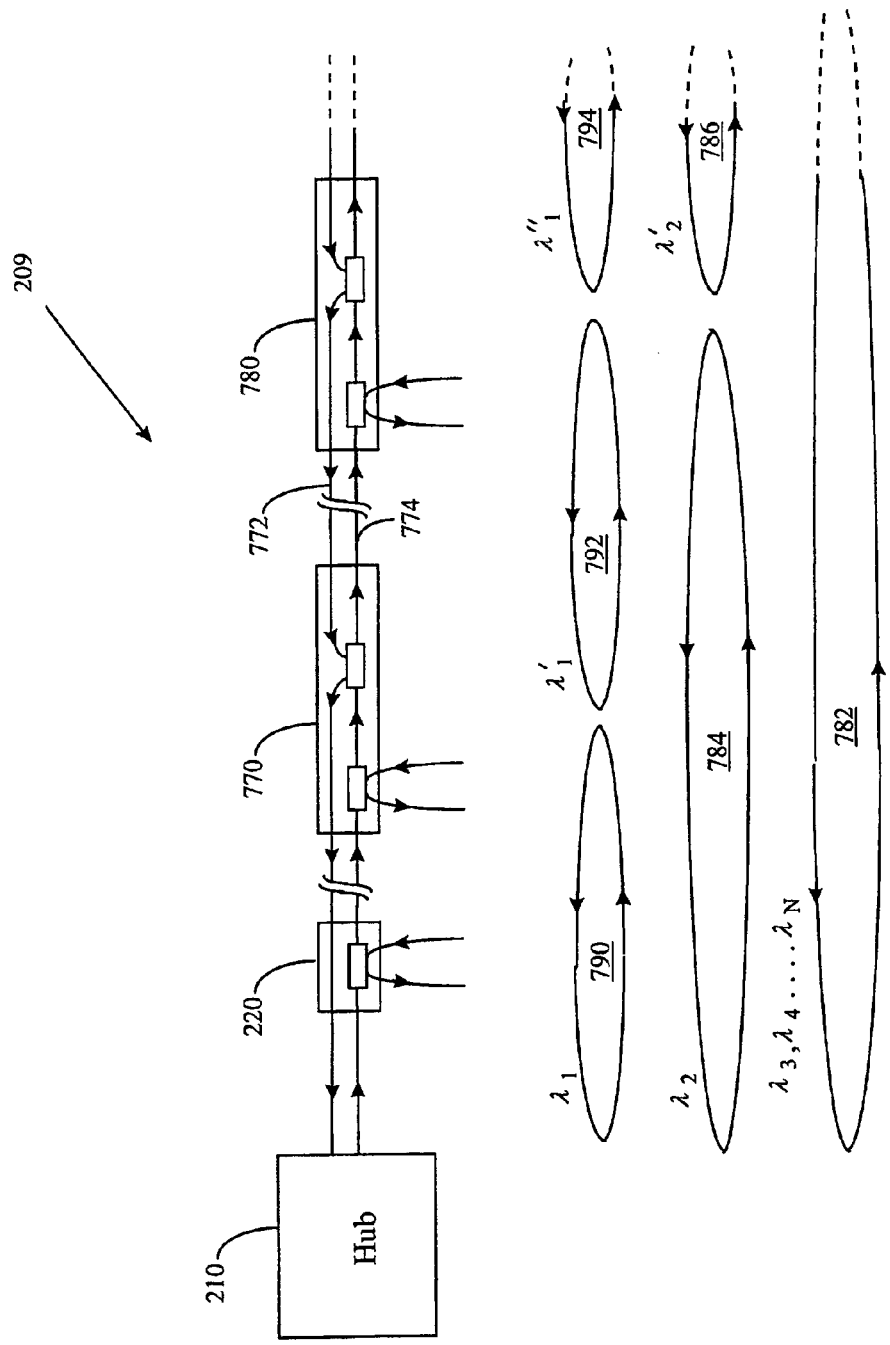
FIG. 17 is a block diagram of a second exemplary branch-ring network having minor-rings.

FIG. 17 is a block diagram of a second exemplary branch 209 capable of providing sub-rings. As shown in FIG. 17, the branch 209 can form a primary communication link traversing entirety of the network portion 209. However, unlike the branch of FIG. 15, the branch-sub-ring-modules 770 and 780 shown in FIG. 17 can provide communication sub-rings of different sizes.

For example, a first branch-sub-ring-module 770 can be designed to return a fust wavelength but pass a number of other wavelengths $\lambda_2, \lambda_2, \ldots \lambda_n$ both from the left-hand side as well as from the right-hand side while the second branch-ring-sub-module 780 can be designed to return both the first and second optical wavelengths $\lambda_1$ and $\lambda_2$. In this fashion, group of sub-rings 790, 792 and 794 are formed that tie together small numbers of ports along the branch 209 and second group of larger sub-rings 784 and 786 are formed that tie together at least three or more ports. While the exemplary network portion 209 shows two sizes of sub-rings, it should be appreciated that the size and number of the sub-rings can vary according to individual design requirements.

Figure 18:
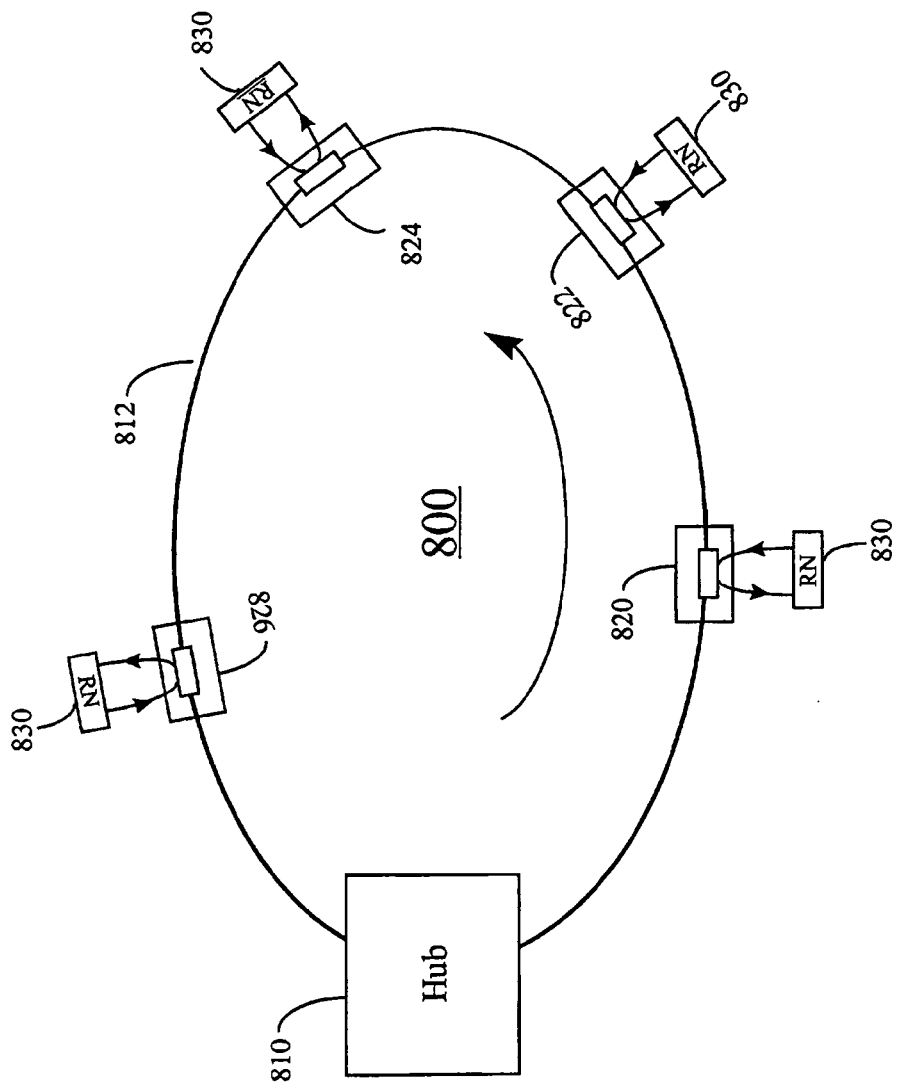
FIG. 18 is a block diagram of a ring network according to the present invention.

FIG. 18 is a block diagram of a ring network 800 according to the present invention. As shown on FIG. 18, ring network 800 includes a hub 810 and four simple distribution-nodes 820-826 each connected to a remote-node. The hub 810 and distribution-nodes 820-826 are connected via optical conduit 812.

In operation, the hub 810 provides the first distribution-node 820 with a group of WDM optical communication signals. The first distribution-node 820 receives the group of WDM optical communication signals, drops one or more selected optical communication signals to its remote-node 830 and adds one or more other selected optical communication signals provided by its remote-node 830 to produce a modified group of optical communication signals. The modified group of optical communication signals is then provided to the second distribution-node 822, and so on, until the last distribution-node 826 provides its group of modified optical signal to the hub 810.

By using one of the above-mentioned diffraction-grating devices to the distribution-nodes 820-826, an extremely reliable and economical optical ring network can be constructed as compared to conventional ring networks.

Figure 19:
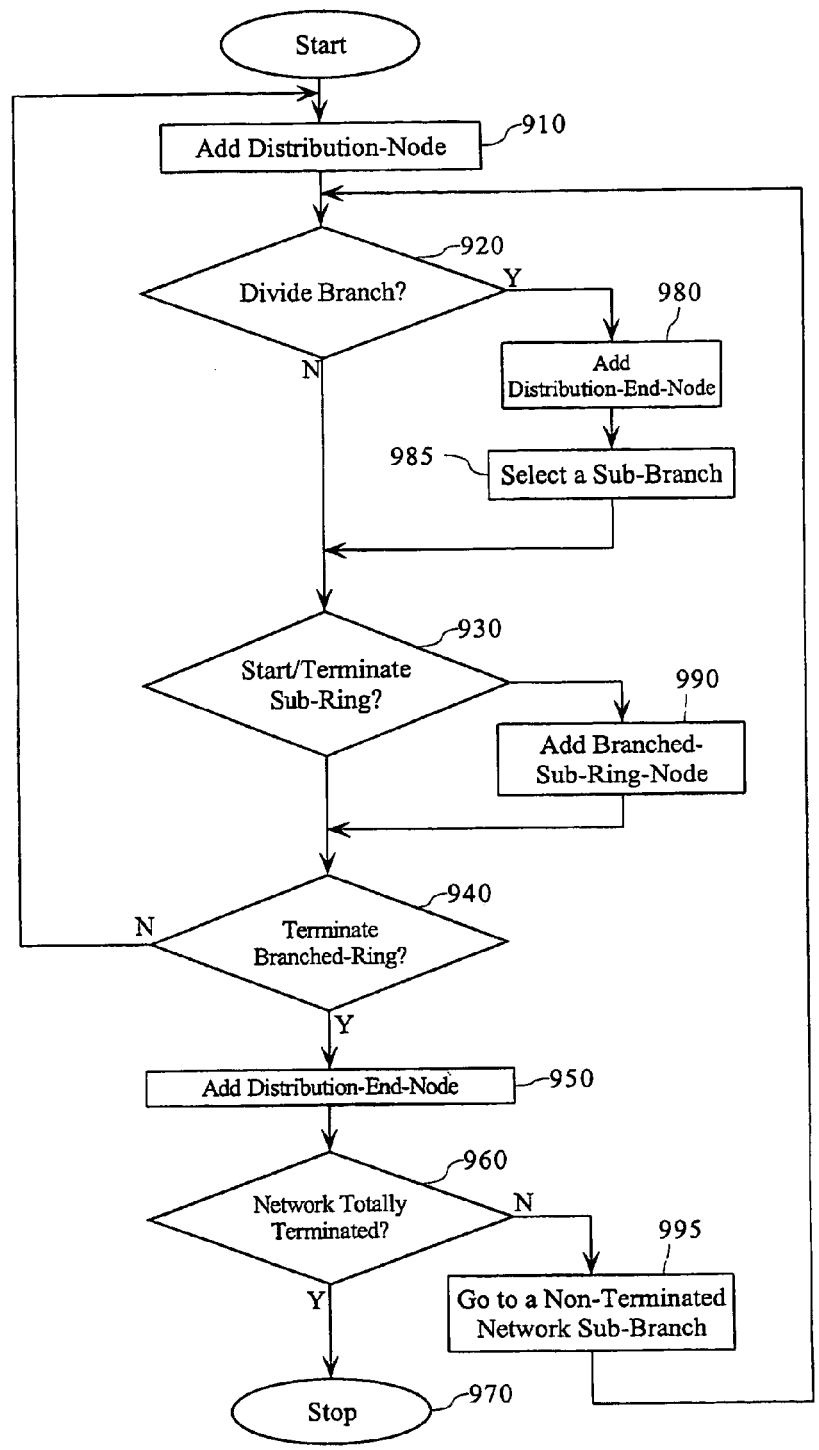
FIG. 19 is a flowchart outlining an exemplary operation for constructing a branch-ring network.

FIG. 19 is a flowchart outlining an exemplary operation for constructing a branch. The process starts in step 910 where a first distribution-node is appended to a network. As discussed above, each distribution-node has an outbound path, a return path and one or more add/drop modules. Furthermore, each distribution-node can vary in nature and can alternatively contain an improved isolation add/drop-module, multiple add/drop modules or multiple improved isolation add/drop-modules. The process continues to step 920.

In step 920, a determination is made as to whether to divide the branch into a number of sub-branches. If the branch is to be divided, control jumps to step 980; otherwise, control continues to step 930.

In step 980, the branch is divided into two or more sub-branches. As discussed above, the branches can be physically divided into two or more sub-branches that share common optical communication signal wavelengths, or each of the branches can be assigned a number of independent optical communication signal wavelengths such that the sub-branches can operate partially or totally independently of each other. Next, in step 985, one of the sub-branches is selected to continue construction. Control continues to step 930.

In step 930, a determination is made as to whether to start or terminate a sub-ring within the branch. If a sub-ring is to be started or terminated, control continues to step 990; otherwise, control continues to step 940. As discussed above, sub-rings can use any number of wavelengths and can span any number of ports in a network portion. Control continues to step 990.

In step 940, a determination is made as to whether to terminate the branch or sub-branch. If the branch/sub-branch is to be terminated, control continues to step 950; otherwise, control jumps back to step 910 where the next distribution-node is appended.

In step 950, a distribution-end-node is appended to the branch/sub-branch to terminate the branch/sub-branch. Next, in step 960, a determination is made as to whether all branches/sub-branches have been terminated. If all branches/sub-branches have been terminated, control continues to step 970 where the process stops; otherwise, control jumps to step 995.

In step 995, a non-terminated branch/sub-branch is selected to continue construction. Control then jumps back to step 920 where a determination is made whether to further divide the newly selected branch/sub-branch.

As shown in FIGS. 1-16, the systems and methods of this invention are preferably implemented on various optical hardware and integrated electrical and optical circuits. However, the systems and methods can also be implemented using any combination of one or more optical and electrical technologies. In general, any device on which the various optical and electrical conduits and interfaces capable of implementing the various elements of FIGS. 1-16 and the flowchart of FIG. 17 can be used to implement the optical network functions.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method for forming a branch-ring optical network, comprising:
    connecting an outgoing optical conduit to a distribution-node, wherein the distribution-node comprises an outbound receiving port for receiving optical communication signals from a hub, an outbound transmitting port, a return receiving port, a return transmitting port, and an add/drop module;
    coupling the distribution-node to a distribution-end-node, wherein the distribution-end-node includes and utilizes a plurality of ports consisting of one outbound receiving port and one return transmitting port, wherein the distribution-end-node transmits to the hub via the return transmitting port of the distribution-end-node an optical communication signal received from the distribution-node via the outbound receiving port of the distribution-end-node, wherein the optical communication signal is transmitted from the return transmitting port of the distribution-end-node to the hub over a return path that traverses the return receiving port and the return transmitting port of the distribution-node, wherein the return path does not include any add-drop modules.

2. The method of claim 1, wherein the add/drop module is a diffraction-grating based device.

3. The method of claim 2, wherein the add/drop module contains an optical fiber with a diffraction-grating structure that divides two or more of the optical communication signals into a dropped group of optical communication signals and a remaining group of optical communication signals, and further adds a third group of optical communication signals to the remaining group of optical signals.

4. The method of claim 2, wherein the distribution-end-node further includes an add/drop module.

5. The method of claim 2, wherein the add/drop module of the distribution-node is an improved-isolation add/drop module containing a separate add-module and a separate drop-module.

6. The method of claim 2, wherein the distribution-node includes two add/drop modules that independently add and drop optical communication wavelengths.

7. The method of claim 3, wherein the add/drop module is coupled to a distribution junction.

8. The method of claim 7, wherein the distribution junction operates on a single optical communication signal wavelength.

9. The method of claim 7, wherein the distribution junction operates on two or more optical communication signal wavelengths.

10. The method of claim 2, wherein the add/drop module is coupled to a summing junction.

11. The method of claim 10, wherein the summing junction operates on a single optical communication signal wavelength.

12. A branch-ring optical network, comprising:
    a distribution-node, wherein the distribution-node comprises an outbound receiving port for receiving optical communication signals from a hub, an outbound transmitting port, a return receiving port and a return transmitting port and an add/drop module; and
    a distribution-end-node coupled to the distribution-node, wherein the distribution-end-node includes and utilizes a plurality of ports consisting of one outbound receiving port and one return transmitting port, wherein the distribution-end-node is configured to transmit to the hub via the return transmitting port of the distribution-end-node an optical communication signal received from the distribution-node via the outbound receiving port of the distribution-end-node, wherein the optical communication signal is transmitted from the return transmitting port of the distribution-end-node to the hub over a return path that traverses the return receiving port and the return transmitting port of the distribution-node, wherein the return path does not include any add-drop modules.

13. The branch-ring optical network of claim 12, wherein the add/drop module is a diffraction-grating based device.

14. The branch-ring optical network of claim 13, wherein the add/drop module contains an optical fiber with a diffraction-grating structure that divides two or more of the optical communication signals into a dropped group of optical communication signals and a remaining group of optical communication signals, and further adds a third group of optical communication signals to the remaining group of optical signals.

15. The branch-ring optical network of claim 13, wherein the distribution-end-node further includes an add/drop module.

16. The branch-ring optical network of claim 13, wherein the add/drop module of the distribution-node is an improved-isolation add/drop module containing a separate add-module and a separate drop-module.

17. The branch-ring optical network of claim 13, wherein the distribution-node includes two add/drop modules that independently add and drop optical communication wavelengths.

18. The branch-ring optical network of claim 13, wherein the add/drop module is coupled to one-of a distribution junction.

19. The branch-ring optical network of claim 18, wherein the distribution junction operates on a single optical communication signal wavelength.

20. The branch-ring optical network of claim 18, wherein at least one of the distribution junction operates on two or more optical communication signal wavelengths.

* * * * *